Patented Feb. 6, 1951

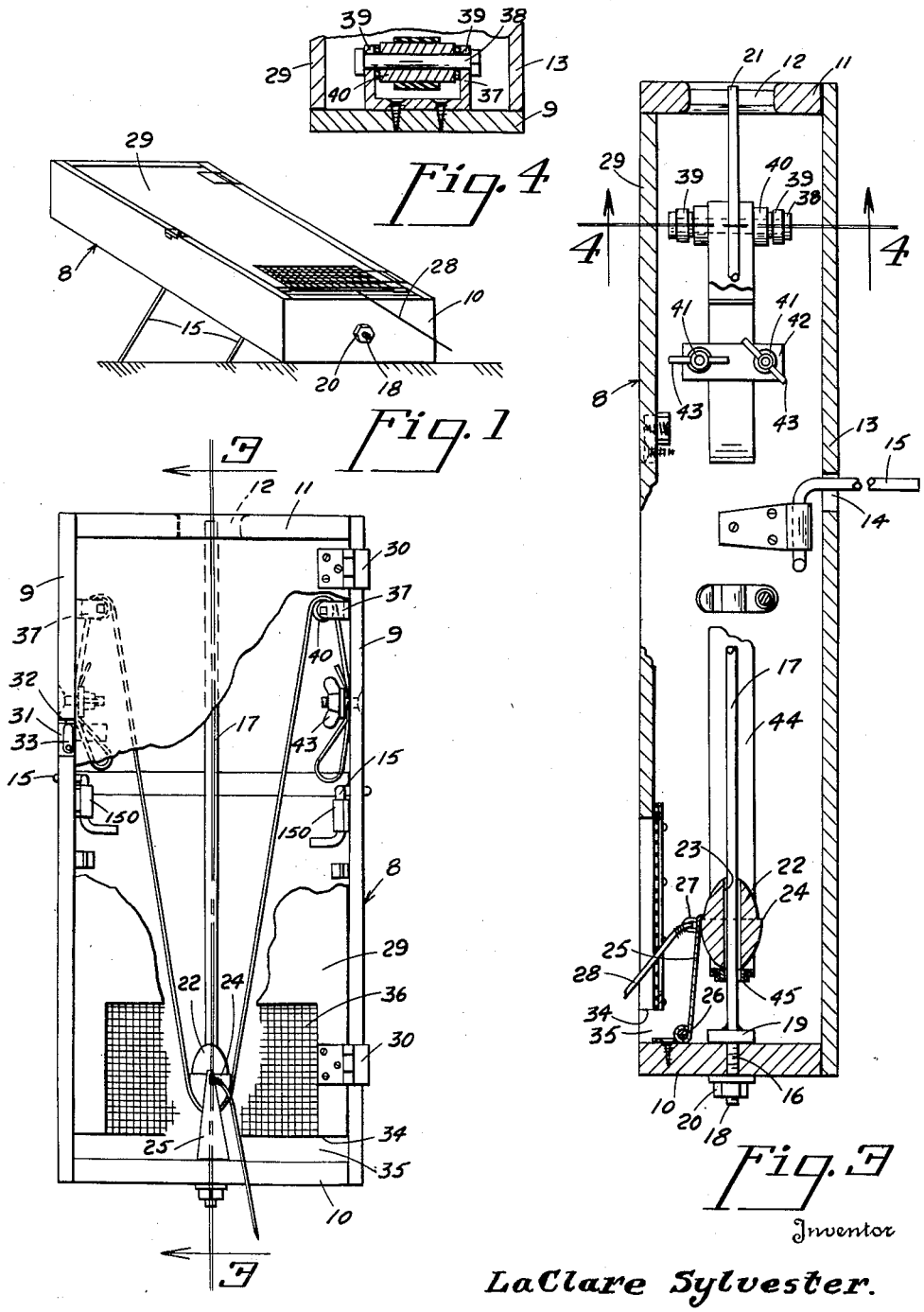

2,540,303

UNITED STATES PATENT OFFICE 2,540,303

RUBBER SPRING TARGET TRAP

La Clare Sylvester, Bethel, Ohio

Application October 29, 1947, Serial No. 782,701

4 Claims. (Cl. 124—21)

The present invention relates to equipment for use in the training of dogs, particularly bird dogs and retriever dogs, and has for an object the provision of a trap whereby a retrievable missile, roughly corresponding in shape and size to the body part of a game bird, may be directionally projected at will to generally simulate the flight of a live bird flushed from the ground in the field in actual hunting.

A particular object of the invention is to provide a readily portable apparatus of the character indicated that may be used in relatively limited space and which can be used selectively as an aid in the training of sporting dogs.

Another object of the invention is to provide a device of this kind that can be adjusted as to direction and angle of the trajectory of a simulated "bird," and that is further adapted for adjustment as to the amplitude or distance of the "flight of the bird."

A further object of the invention is to provide a missile or "bird" that is adapted to have a selected volatile scent applied thereto and disposed in the trap or projecting apparatus so that the dog under training may be allowed to locate the entrapped "bird" by the scent, and to then follow the flight thereof when the trap is sprung and the "bird" is released by the trainer.

Still another object of the invention is to provide a trap of the character indicated which allows the scent from the previously deposited "bird" to escape and drift while the "bird" and operating mechanism for projecting it are safely shielded against access by the dog and against accidental injury to the animal or its trainer by the projection apparatus.

A further object of the invention is to provide a simple and adjustable mechanism for the indicated purpose. including a light-weight and very durable, guided elastic sling.

These and other important objects are attained by the means hereinafter described and exemplified in the accompanying drawings, in which:

Fig. 1 is a perspective view showing the trap as viewed from the rear.

Fig. 2 is a top plan view of a trap of the invention in a "set" condition, the cover being largely broken away.

Fig. 3 is a cross-sectional view taken on line 3—3 of Fig. 2.

Fig. 4 is a cross-sectional view taken on line 4—4 of Fig. 3.

In the conventional training of various breeds of pointing dogs and those breeds of dogs used for retrieving purposes, considerable space is required in the open country where the desired game can be found. The needed opportunity to train the dog and to regulate its behavior in the presence of game and the shooting of the game, is quite limited and is seldom entirely certain. By the device of the invention, a dog may be pre-trained in all of the final details of field behavior in localities where no game is to be found and where only relatively limited space is available for training purposes.

The device or trap comprises an elongated casing 8 having longitudinal side walls 9, rear wall 10 and a front wall 11, which latter wall is provided with an unrestricted discharge aperture 12. A bottom wall 13 has, in the present embodiment, a transverse slot 14 through which metal rods 15, constituting foldable and adjustable legs, may be extended to operatively support the casing 8 in an inclined position with a bottom corner edge of rear wall 10 resting on the ground and the front wall 11 elevated above the ground. The legs are collapsible, by any suitable means such as hereinafter described, for moving them to an inoperative position substantially within the body line of the casing. The rear wall 10 has a perforation 16 concentrically arranged with relation to the aperture 12 in the front wall 11. A stiff trajectory rod 17 has a threaded end 18 extending through perforation 16, and it is rigidly fixed in perpendicular relation to said rear wall by suitable means such as a flange 19 on the rod 17 abutting the inside face of wall 10 and a suitable clamping nut 29 screwed on to the exteriorly projecting end portion 18 and rigidly drawing the flange 19 into position from the outside of the casing. The trajectory rod 17 is stiff and in true axial alignment with the centers of perforation 16 and aperture 12. A projectile or "bird" 22 has an axial bore 23 such that the projectile 22 may be slidably guided on trajectory rod 17. The bird 22 is circular in cross-section, and is of a length such that the wall of the bore 23 may constitute an ample guide for the bird on the rod. The opposite ends of the bird are rounded to insure a minimum of air resistance, and an annular groove or ridge 24 intermediate the ends serves as a means for engaging with the downturned end of a movable trigger, or latch 25 which is hinged as at 26 to the inside face of rear wall 10 above the mounting of rod 17. The bird 22 may be of light wood or comparable material that the dog can conveniently carry in its mouth. Trigger 25 has means such as a loop 27 for receiving a pull cord 28 which passes over the top edge of said rear wall. A cover member 29 is mounted on one longitudinal wall 9 by means of hinges 30 and has on its opposite side a projecting lug 31 which seats in a notch 32 in the top of the other side wall 9. A pivoted member 33 on wall 9 serves as a movable keeper for lug 31 whereby cover 29 is retained closed. Any suitable latch mechanism, which is not capable of accidental opening by a dog, may be employed in lieu of members 31 and 33. The rear end 34 of the door is spaced at a distance from the inside face of rear wall 10 thus leaving a narrow opening 35 in the top of the closed and latched casing 8 for passing the pull cord 28. A section of the cover 29 intermediate its edges and extending from the edge 34 for a distance forwardly is cut away and provided with a screened vent. The screened vent area 36 and slot 35 serve to permit escape of the odor of a suitable volatile scent medium (not shown), simulating the odor of live game that is applied sparingly to the surface of the bird 22, and to prevent the dog from reaching the interior of the trap.

An elastic sling device is provided within the casing 8 for cooperation with a bird 22 on trajectory rod 17, and said sling is arranged to be adjusted as to the tension under which it is placed when the bird 22 is in the latched or set position shown in Figs. 2 and 3 and under the control of trigger latch 25. A pair of oppositely disposed U-shaped brackets 37 are secured to the inside faces of the respective side walls 9 of the casing, and each bracket has a suitably secured bolt 38, passing between the legs 39 thereof, serving as an axle for a free turning wooden roller or pulley 40. Rearwardly of brackets 37, each side wall 9 has a pair of inwardly extending threaded studs 41 adapted to receive a perforated clamping bar 42 which is releasably held in clamping position by wing nuts 43. An elongated sling strap 44 of heavy elastic material, such as rubber, has a perforation midway between its opposite ends and between its lateral edges and a perforated reenforcing plate 45 of the same or a different material is fixed to said strap with the perforations in the plate and strap in registry for receiving the trajectory rod 17, so that the true center of the sling passes over the rod and is guided thereon by the reenforcing structure 45. The free ends of strap 44 are passed over the adjacent and forward sides of the respective rollers 40 and are drawn back along walls 9, to and beneath the respective clamping bars 42, the excess length of the end of each strap being again doubled back beneath the clamping bar. By the arrangement an elastic sling that is very long in proportion to the trajectory rod 17 and casing 8 may be employed in a relatively small trap and with exceptionally effective results. The added length of elastic affords greater ease in setting the projectile and smoother projection thereof when released. The rollers 40 turn on their axles when the sling is being stretched and as it is released, thus allowing a minimum of wear on the faces of the elastic strap which contact the rollers. The readily portable trap thus houses a greater length of elastic sling and a considerable range of adjustment of its effective length is afforded. With the sling strap tightened and adjusted in the manner described, the trap is ready for use. The legs 15 are attached by passing angularly bent end portions thereof through hollow brackets 150 that are secured inside the casing adjacent opposite ends of the slot 14. The legs may be swung transversely of their mountings and the ends may be entered into the ground to insure firm anchorage and to afford the selected elevation of the front end of the casing. The direction of the "flight" and the trajectory angle are thus easily arranged independently of the elastic propulsion force of the sling.

In using the bird or projectile 22, it may be passed through opening 12 from the outside of the trap and over the trajectory rod 17 thereby entering the rod into the bore 23 in the bird. The projectile 22 is then placed against the reenforced center of the sling which surrounds the rod and the sling stretched out and elastic tension is built up therein as the bird is pulled along rod 17 to the rear of the casing. The trigger piece 25 is caused to engage the notch or ridge 24 on the bird whereupon the bird 22 is set in latched position in the trap. The trigger pull cord 28 is carefully laid over end wall 10 of the casing whereupon the cover 29 is closed and latched. The casing may be propped up at the desired angle of trajectory before or after setting the trap, and the dog trainer may place the trap in a slightly concealed place and dispose a long pull cord 28 to hang on a fence, tree limb or the like where it is readily accessible to him when he reaches the vicinity of the trap following the trainee dog on a leash. When the dog has located the bird 22 by the volatile scent, the trainer will devote his attention to the particular stage of training for which the dog is then ready. He may teach him merely to stand on point, or, in more advanced training for a dog which is to hunt to the gun, the trainer may initiate the flight of the bird by pulling the cord 28 while giving proper attention and instruction to the dog, and he may follow through by firing a blank shell from the gun and allowing the dog to retrieve the bird 22 at the end of its trajectory. The trap lends itself to the wide variety of exercises involved in complete training of bird dogs and retriever dogs, or in training other dogs to retrieve.

In the actual operation of setting and firing the trap, the abrasion and possible cutting of the elastic strap 44 is substantially avoided because the bearing on rollers 40 is a moving bearing wherein the surface of the roller travels with the contacting part of the strap as it is stretched. When it is desired that the distance to be traveled by the projectile or bird 22 is to be changed, the strap ends are loosened by releasing the clamping bars 42 and the straps are uniformly taken up or let out at each side to increase or decrease the tension under which the sling is placed when the bird 22 is latched in the position shown in Figs. 2 and 3.

Traps made in accordance with the essentials of the disclosure herein are long lived, and "flight" of the bord may be reliably regulated both as to the distance and the direction of its travel by regulating the angle of incline of casing 8 on its legs 15 and by adjusting the length of the untensioned straps forming the loop between the rollers. The effective length of the sling is from the clamp bars 42, forwardly about the front of rollers or pulleys 40 and thence to the center of the reenforcing guide plate 45. It will be noted that when the sling is operatively held under tension it assumes a sort of M-shape as viewed from above and the trajectory rod passes through the center and projects beyond it in both directions. The projectile is carried along a portion of the rod under the power of the sling and it travels guidedly over the remainder of the rod and leaves the free end thereof under the momentum of the impulse which it receives from the elastic sling after the trigger mechanism releases it.

What is claimed is:

1. A dog training trap comprising an elongated casing, having a front wall with a discharge opening therethrough, a rear wall, and a pair of sidewalls connecting said front and rear walls, a trajectory rod fixed at one end to said rear wall and extending through the interior of the casing and terminating substantially in the center of the discharge opening, an elastic sling strap having a reenforced perforated midsection guidedly supported on the rod, clamp means fixedly located on the opposed interior sidewalls of the casing intermediate the ends thereof for holding the ends of the sling strap substantially in a common plane with the axis of the rod, said rod being adapted to slidably receive a centrally bored projectile entered through the discharge opening and over the free end of the rod for engaging the midsection of the sling, and releasable means connected to the casing adjacent the fixed end of the rod arranged and adapted to engage on and to hold a projectile so inserted against the tension of the sling strap.

2. In a trap of the class described the combination of a protective casing having an opening in one end thereof, a trajectory rod fixed at one end on the opposite end of the casing and extending through the casing concentrically into said opening, a flat elastic sling strap having a perforation located midway its ends and sides, said rod extending through said perforation, means mounted on opposite interior sides of the casing for fixedly holding the opposite ends of the strap with the longitudinal center of the strap in a common plane with the axis of the rod, that portion of the strap surrounding the said perforation therein serving as an elastic seat for engagement on an axially bored projectile inserted over the rod against the elastic resistance of the strap, trigger means connected to the casing adjacent the fixed end of the rod for engaging the inserted projectile forwardly of the said perforated seat portion of the strap for holding the projectile against the elastic tension of the strap, and a pull cord connected with the trigger means and extending outside the casing for manual operation to release said trigger means.

3. In a trap of the class described the combination of means providing an elongated support adapted to rest on the ground, a leg on each side of the support for holding the front end of the support in selected elevation above the rear end thereof, a trajectory rod rigidly fixed to the rear end of the support, and extending forwardly to the front end of the support, a flat, elastic sling strap having a perforation midway its sides and ends and having said rod extending therethrough, a pair of pulleys mounted one on each side of the support near the forward end thereof and carrying intermediate portions of the strap, said pulleys having their axes of rotation parallel to each other and spaced apart on opposite sides of the rod, means for clamping the respective free ends of the strap to opposite sides of said support rearwardly of the pulleys and at an elevation such that the entire longitudinal center line of said elastic strap is at all times disposed in a common plane with the longitudinal axis of the rod, a trigger means connected to the support near the rear end of the rod and movable toward and away from said rod, said rod adapted to receive an axially bored projectile thereon for manual movement against the resistance of the elastic sling strap to the rear end of the rod, said trigger adapted to be engaged on such projectile forwardly of its engagement on the strap in the last named position, and remote control means for releasing the trigger.

4. In a trap the combination of a casing, a trajectory rod rigidly supported at one end only in the rear end of the casing, a flat elastic sling strap having a perforation intermediate its ends and sides, the perforation passing over the rod to retain the midsection of the strap in freely guided relation on the rod, means on the opposite interior sides of said casing and positioned intermediate the ends thereof for fixedly securing the respective ends of the strap with the longitudinal center of the strap in a common plane with the axis of the rod, a pair of pulleys mounted respectively on the opposite interior sides of the casing and spaced apart equidistant from the front end of the casing and equidistant from opposite sides of the rod, the axis of rotation of the pulleys being in parallelism with each other and passing perpendicularly through the aforesaid common plane, said strap passing flatwise forwardly from each of its fixedly secured ends and thence around the said pulleys whereby those portions of the strap intermediate the perforation and the respective ends are held in the aforesaid common plane and are tractionally supported during longitudinal elastic tensioning and relief of said portions as the midsection of the strap is moved rearwardly and forwardly along the rod, and a trigger means carried by the support and movable toward and away from the rod, said rod being adapted to have an axially bored projectile forcibly passed over it and into seating contact with the midsection of said strap for uniformly tensioning said strap as the projectile is progressively pushed into range of movement of the trigger, said trigger means adapted to engage on the projectile forwardly of its seat on the strap.

LA CLARE SYLVESTER.

REFERENCES CITED

The following references are of record in the file of this patent:

UNITED STATES PATENTS

| Number | Name | Date |
| --- | --- | --- |
| 224,254 | Warne | Feb. 3, 1880 |
| 310,873 | Bradley | Jan. 20, 1885 |
| 358,526 | Woods | Mar. 1, 1887 |
| 720,478 | Popenhagen | Feb. 10, 1903 |
| 928,777 | Meyer | July 20, 1909 |
| 1,266,276 | Kennedy | May 14, 1918 |
| 1,541,579 | Kikta | June 9, 1925 |
| 1,605,300 | Thompson | Nov. 2, 1926 |
| 1,831,230 | Copas | Nov. 10, 1931 |
| 2,144,805 | Koch et al. | Jan. 24, 1939 |

FOREIGN PATENTS

| Number | Country | Date |
| --- | --- | --- |
| 13,263 | Great Britain | 1890 |
| 344,008 | Germany | Nov. 11, 1921 |